United States Patent [19]
Morgan

[11] Patent Number: 4,992,866
[45] Date of Patent: Feb. 12, 1991

[54] CAMERA SELECTION AND POSITIONING SYSTEM AND METHOD

[76] Inventor: Jack B. Morgan, 2040 Pheasant Hill La., Auburn, Calif. 95603

[21] Appl. No.: 373,383

[22] Filed: Jun. 29, 1989

[51] Int. Cl.$^5$ .................. H04N 5/247; H04N 7/18
[52] U.S. Cl. ........................ 358/108; 358/181; 340/825.06; 340/825.49
[58] Field of Search ............... 358/181, 108, 224, 209, 358/93; 340/506, 514, 516, 524, 525, 540, 541, 635, 691, 825.06, 825.36, 825.37, 825.49

[56] References Cited

U.S. PATENT DOCUMENTS

| | | | |
|---|---|---|---|
| 4,074,225 | 2/1978 | Vandeweghe | 340/524 |
| 4,120,004 | 10/1978 | Coutta | 358/108 |
| 4,237,483 | 12/1980 | Clever | 358/108 |
| 4,566,036 | 1/1986 | Kadosawa | 358/209 |
| 4,581,634 | 4/1986 | Williams | 358/108 |
| 4,737,847 | 4/1988 | Araki | 358/108 |

Primary Examiner—Tommy P. Chin
Attorney, Agent, or Firm—Flehr, Hohbach, Test, Albritton & Herbert

[57] ABSTRACT

An apparatus for a closed circuit television network having a plurality of video cameras producing video signals, a plurality of video display monitors and a video switcher apparatus coupled therebetween, comprising control apparatus coupled to the video switcher apparatus for controlling which video signals are displayed on each of the plurality of video display monitors. Also provided are graphics user interface apparatus coupled to the control apparatus for permitting a user to operate the control apparatus, thereby permitting the user to control which video signals are displayed on the plurality of video display monitors.

18 Claims, 4 Drawing Sheets

| | ICONS TOUCHED | | | OPERATION MODE | DESCRIPTION OF PROCESSOR ACTION TAKEN |
|---|---|---|---|---|---|
| | MONITOR | CAMERA | VIEW | | |
| 1 | | | X | FULL AUTOMATIC | PROCESSOR SELECTS AND PANS CLOSEST REMOTE TO SELECTED AREA AND SELECTS NEXT AVAILABLE MONITOR AUTOMATICALLY. |
| 2 | | X | X | SEMI-AUTOMATIC | PROCESSOR PANS DESIGNATED REMOTE CAMERA TO SELECTED AREA AND SELECTS NEXT AVAILABLE MONITOR AUTOMATICALLY. |
| 3 | X | | X | SEMI-AUTOMATIC | PROCESSOR SELECTS AND PANS CLOSEST REMOTE CAMERA TO SELECTED AREA AND DISPLAYS IMAGE ON SELECTED MONITOR. |
| 4 | X | X | X | MANUAL | MONITOR, CAMERA AND VIEW ARE ALL DESIGNATED BY THE OPERATOR. |
| 5 | X | | | SEQUENCING MONITOR FREEZE | IF SELECTED MONITOR IS SEQUENCING CAMERA VIEWS, SEQUENCING WILL STOP. TOUCHING ICON STARTS SEQUENCE AGAIN. |
| 6 | X | | | MONITOR CLEAR | IF MONITOR HAS STATIC VIEW (NON-SEQUENCING) IT WILL BE CLEARED WHEN MONITOR ICON IS TOUCHED. |
| 7 | | X | | CAMERA SELECT | ALLOWS OPERATOR TO MONITOR AND PAN CAMERA SELECTED AUTOMATICALLY. |
| 8 | X | X | | CAMERA SELECT ON MONITOR | ALLOWS OPERATOR TO MONITOR AND PAN CAMERA SELECTED MANUALLY. |

FIG.-3

FIG.-4 and method according to the present invention has a plurality of video cameras producing video signals, a plurality of video display monitors and a video switcher apparatus coupled therebetween, including control apparatus coupled to the video switcher apparatus for controlling which video signals are displayed on each of the plurality of video display monitors. Also provided are a graphics user interface apparatus coupled to the control apparatus for permitting a user to operate the control apparatus, thereby permitting the user to control which video signals are displayed on the plurality of video display monitors.

CAMERA SELECTION AND POSITIONING SYSTEM AND METHOD

BACKGROUND OF THE INVENTION

1. Field of the Invention

The present invention relates to control systems for closed circuit television observation systems. More specifically, the present invention relates to a closed circuit television observation system controlled by a computer and accessed by a graphic user interface.

2. Summary of the Prior Art

For quite some time now, closed circuit video cameras have been used as monitors. They have been used for security purposes and also for observation purposes, i.e., hospitals, etc. The primary use, however, has been for security. For example, prisons, military bases and private real estate, etc. use closed circuit television networks to provide security.

Often the closed circuit security setup includes a plurality of video cameras, a plurality of video monitors, a video switching unit and some type of mechanical interface which allows the user to determine which video camera output signals are going to be displayed on the monitors.

The user can physically select which of the cameras the user wants to appear on a particular monitor. Thus, the user will have perhaps 50 or 100 cameras and will be able to select which of the plurality of cameras he wishes to display on the monitor(s). The user effects the selection of cameras to view on the monitor(s) by flicking switches or pushing buttons located on the monitoring console.

The video switcher may be interfaced to an external alarm system and an alarm event may then cause a predetermined camera and view to be selected and displayed. It is not always clear to the user, where the source of video is coming from when the video is switched automatically.

Typically any one of the monitors may be setup to display a user selected sequence of camera views. Each view is held for a matter of seconds and then sequences to the next predetermined view. A sequencing monitor may be stopped at a particular view for further analysis.

Experience has shown that in the field of video surveillance that the most efficient number of video monitors is four to six. If more than six monitors are provided it has been shown that the operator may become visually overloaded and be incapable of accurately viewing all that transpires on the monitor screens. Therefore, the general practice in the industry is to reduce the number of display monitors. As a result, video output signals from the plurality of camera are viewed on a limited number of monitors.

Research has determined that approximately 99% of the time that the surveillance system is being monitored, nothing is happening. It is only 1% of the time that something of interest is taking place. What frequently happens in that crucial 1% of viewing is that the operator has a tendency to become confused about the proper operation of the surveillance system. Additionally, it may not be clear to an operator where a particular problem area, viewed on a monitor, is physically located.

Operators with little experience find it particularly difficult to operate the prior art's complicated control console in times of substantial duress. It is desirous, therefore, to reduce the confusion and resulting reaction time delays.

OBJECTS AND SUMMARY OF THE INVENTION

Accordingly, it is the object of the present invention to provide a closed circuit television network having a user friendly interface between the user and the network which enables the user to accurately operate the network in times of duress.

The graphics user interface clearly displays where the active cameras are located in the system, and what targets they are currently pointing at. This same interface display allows the operator to easily select new cameras and their respective views.

It is still another object of the present invention to provide a closed circuit television network having a computer control apparatus for providing video camera and monitor selection functions, alleviating the user from making these decisions, and thereby reducing the effects of panic and duress known to accompany emergency situations.

The attainment of these and related objects is made possible by the camera selection and positioning system

DETAILED DESCRIPTION OF THE PREFERRED EMBODIMENT

Figure 1:
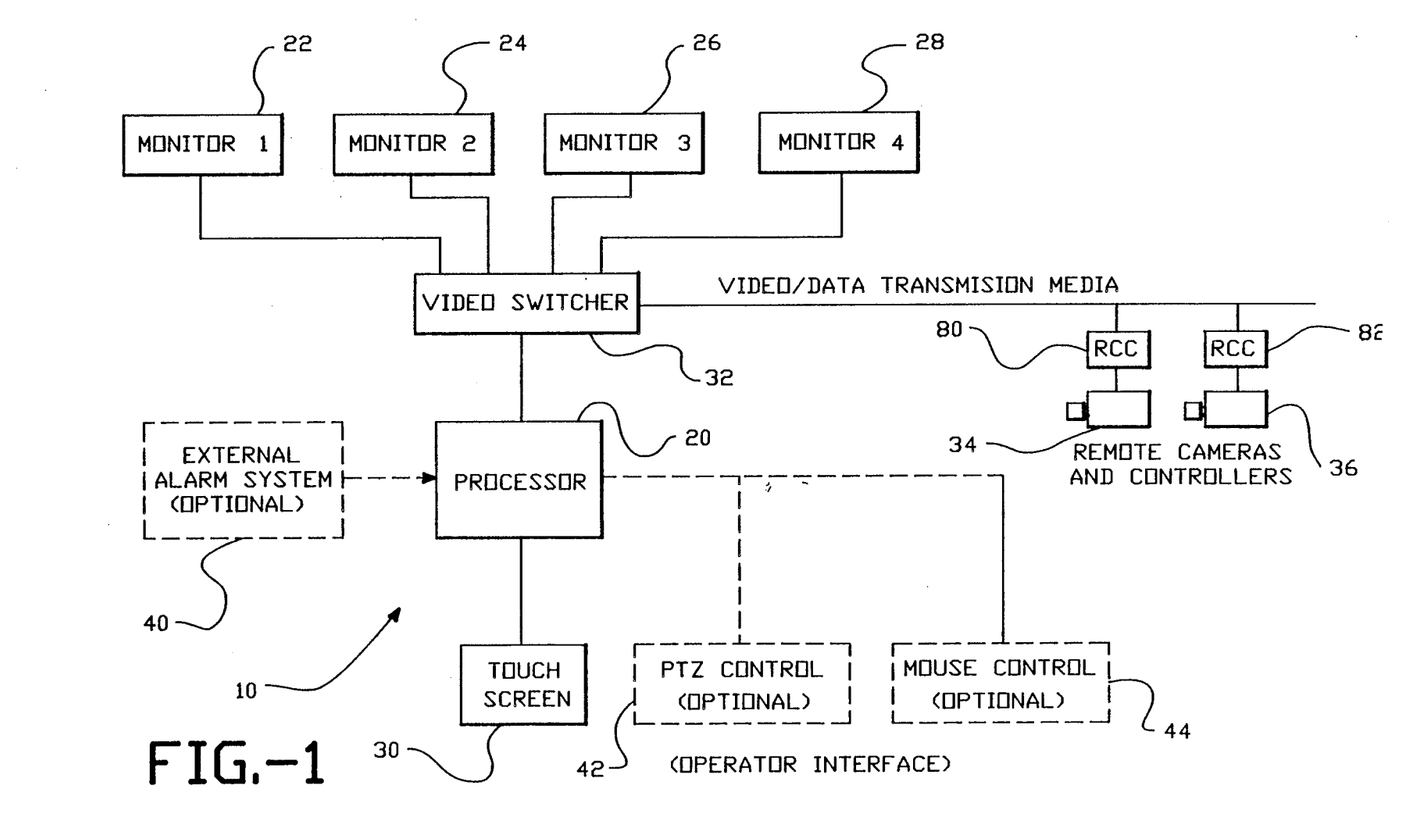
FIG. 1 is a block diagram of the closed circuit television network of the preferred embodiment.

Referring to FIG. 1, a block diagram of the closed circuit television network 10 of the preferred embodiment is shown. A substantial part of the preferred embodiment lies in the use of a processor 20. The processor provides a "thinking" capability which permits the network 10 to operate in any of a number of states, based on a plurality of inputs. The processor 20 is capable of making decisions quicker than a human operator. The processor 20 makes decisions more efficiently because it is not affected by duress or excitement, phenomena which commonly cause operator error in humans.

Figure 2:
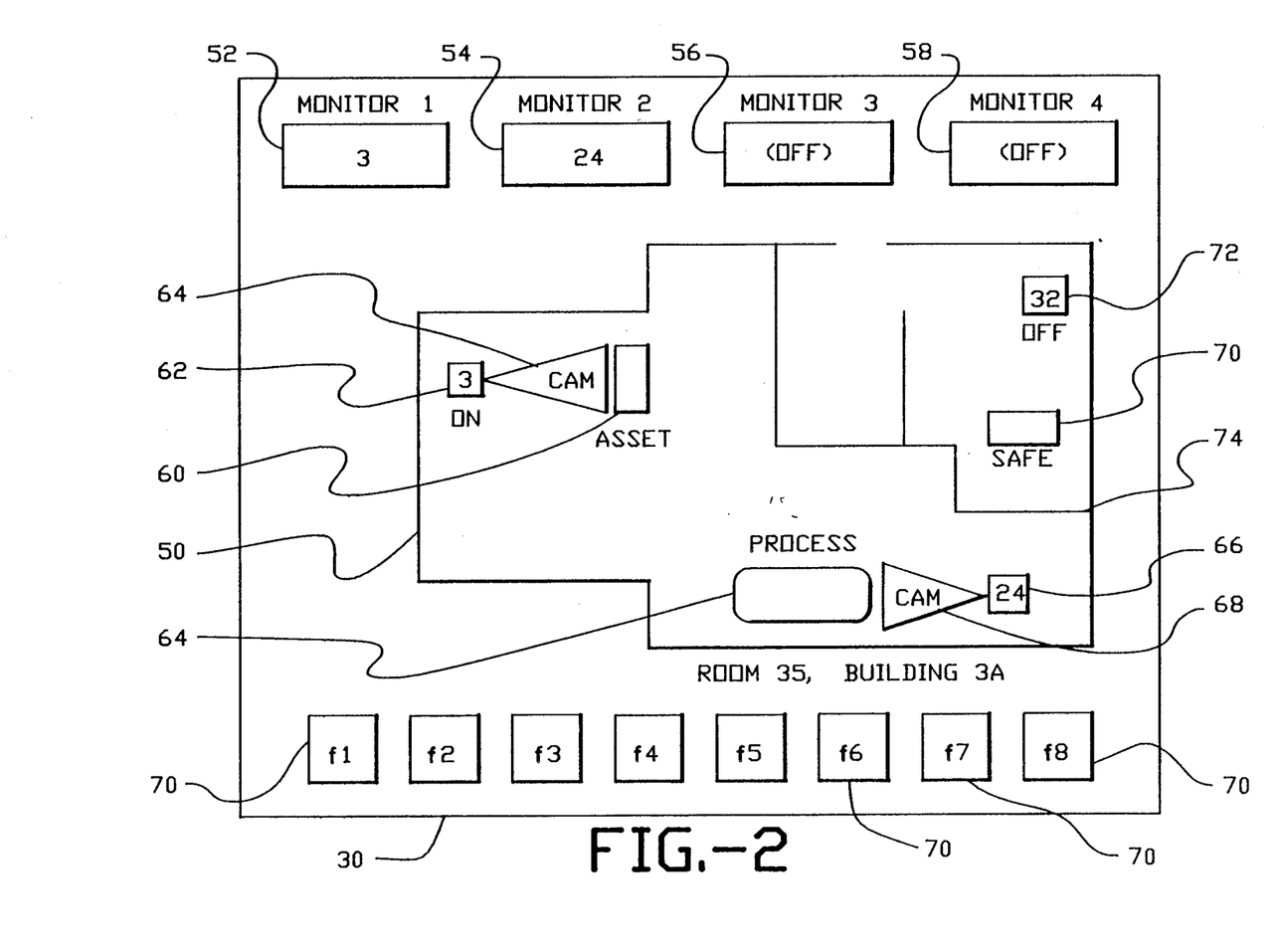
FIG. 2 is an illustration of the graphics user interface of the preferred embodiment.

A primary aspect of the preferred embodiment is the use of a graphics user interface screen 30 between the user and the processor 20. Referring to FIG. 2, the interface screen 30 is designed to provide a graphical representation (similar to a "map") of the area that a user chooses to view. Depending on what mode the network is operating in, the user can simply point to a specific area on the "map" and the processor 20 will determine which camera has the best view of that specific area and select that view to be displayed on one of the monitors. Therefore, instead of having to deal with switches, buttons and knobs, the user merely has to point to an area on the touch screen 30 to have a view of the area displayed. This arrangement significant reduces the amount of time necessary to locate and track a particular scene because only minimal thought process is required. The user simply points to the desired area on the screen. That area is instantaneously displayed on a screen. Alternately, the operator may "point" with a "mouse" (44 of FIG. 1) rather than using the touch sensitive screen. The network actually operates in a plurality of modes which provide great flexibility to the user in deciding how best to meet the user's monitoring needs (these modes are described in more detail below).

Referring again to FIG. 1, four video monitoring screens are provided 22, 24, 26 and 28. These video monitors 22, 24, 26 and 28 are standard video monitors and may be color or black and white. The video monitors 22, 24, 26 and 28 are connected to a video switcher 32. Also connected to the video switcher 32 are input lines from a plurality of remote cameras 34 and 36. In an actual network there may be over 100 cameras, therefore, remote cameras 34 and 36 are presented merely as representative of cameras that may be used in the network 10. The network 10 is not to be limited in the number of remote cameras that it has and, in general, the remote cameras in a network will greatly outnumber the monitors.

Remote camera controllers (RCC) 80 and 82 are connected to the remote cameras 34 and 36, respectively. The RCCs 80 and 82 provide information to the processor 20 camera position, field of view, and tilt or zoom, if applicable. The RCCs are communicated with, or polled, on a rapid and frequent basis. Position information from these cameras is encoded at the pan and tilt motor drive, typically using potentiometers as encoders. The potentiometer. are used to develop a voltage proportional to the camera's position. This voltage is converted into a digital equivalent and reported by the RCC back to the processor 20 for display on the graphics display screen 30. The result is that the camera icon on the graphics screen accurately reflects the real-time status of the remote camera 34 and/or 36.

Camera position changes are generated by touching the graphics display 30, or PTZ control 42, and are communicated by the processor 20 to the remote RCC 80 and 82. The RCCs store the new position information and start the respective motors to effect the new position desired. When the encoded position information matches the newly requested position, the control motors are shut off. The camera icon on the graphics display tracks the remote camera as it moves to the new location.

The function of the switcher 32 is to effectively display video signals from reflected ones of the plurality of cameras 34 and 36. The premise behind the operation of the switcher is that it is inefficient to display all the remote camera video signals at once. Cameras then selected for viewing in several ways: as an automatic response to an external alarm, as a result of a manual input by the operator, and as part of a preset sequencing of camera views on a particular monitor. The switcher is always under the control of processor 20. A suitable video switcher is the matrix 44 produced by Vicon Industries, Inc. of Melville, N.Y.

The processor 20 which is coupled to the switcher 32 is typically a standard 16 bit industrialized personal microcomputer. These computers are capable of being rack mounted in control consoles. In addition, they have heavy duty power supplies and good filtering systems permitting twenty-four hour a day operation. Processor 20 monitoring circuitry is included that supervises proper processor operation and causes a reboot if errors are detected. As will be discussed below with reference to FIG. 3, the processor 20 permits the network 10 to operate in a plurality of modes.

The processor 20 is controlled by the user through the graphics interface screen (FIG. 2). The screen 30 is typically a high resolution color CRT with a touch sensitive overlay. A touch screen is used for the preferred embodiment because it permits direct user interaction, i.e., all the operator has to do is point and touch. Alternately, however, a personal computer "mouse" could also be used to designate a specific portion on the screen.

The processor 20 also receives input from an external alarm system 40. The external alarm system includes a plurality of sensors distributed throughout the area that the network 10 is securing. The sensors may be motion detectors, or pressure sensors located in floors, or fence disturbance sensors, etc. When one of the sensors is activated a signal identifying the sensor is sent to the processor 20. The processor 20 acts on this signal to select the closest camera to the sensed area to view the sensed area and switches the selected camera's output video signal to a monitor 22, 24, 26 or 28. When the sensed area is displayed on the monitor, the screen 30 graphically illustrates which camera is being used and what monitor the camera is being viewed on.

The software for the external alarm 40 is a standard driver routine. It addresses the serial port on the processor 20. The external alarm sends a digital message to the processor 20, indicating the zone where the alarm has been tripped. It also sends a status signal, i.e., whether the zone has been acknowledged or not. An unacknowledged zone may be shown on monitor 30 as a flashing object, or one colored red, or an object designated by a particular shape.

An additional feature which may be connected to processor 20 is the pan-tilt-zoom (hereinafter "PTZ") control mechanism 42. The PTZ mechanism 42 permits a user, once a particular PTZ camera has been selected through the screen 30, to control the PTZ of that camera using a joystick or keypad control. In such an arrangement, the user is offered another dimension of flexibility in viewing a particular scene.

Referring to FIG. 2, a graphical representation of the screen 30 is shown. The representation is comprised primarily of a "map" segment (hereinafter "map" 50) and four icons or windows 52, 54, 56 and 58. The windows 52, 54, 56 and 58 have labels that identify particular monitors. The first window 52 (from the left) designates which camera, if any, is being displayed on monitor one 22, the second window designates which camera, if any, is being displayed on the second monitor 24, and so on for windows 56 and 58. If no camera is being displayed in a particular monitor 22, 24, 26 or 28 the window is blank or says "off."

The map segment 50 displays a graphical representation of real estate or an object that is being secured. The map 50 is stored in the memory of the processor 20.

Different maps 50 may be called out of memory as desired. In a typical situation an entire floor plan of a building may be recalled from the processor memory. The user can designate any room, hallway or stairwell, etc., that the user would like to view and the processor 20 automatically calls the specific individual map 50 for that area. The specified area map is then displayed on the screen 30. From the displayed map 50 the user can designate the area he or she wants to monitor, and even the camera and monitor to be used, if so desired.

For instance, if the user wanted to view the asset 60 (FIG. 2), the user would touch the representation of asset 60 on the touch screen 30. The map 50 (of room 35, building 3A), has a coordinate pattern that corresponds to areas of the touch screen 30 when it is touched. When the user touches the asset 60, the closest camera 62 to the asset is switched to an available monitor. The wedge 64 indicates the field of view of the camera 62 and if it is not already pointed at the asset, it will start to rotate towards it tracking the movement of the camera. The display wedge width and length is proportional to the zoom and focus of the lens, respectively. Viewing the field at view 64, the user knows camera 62 (camera 3) is viewing the asset 60 because the field of view of the camera 62 is focused on the asset 60. By looking to the upper left hand corner of the screen 30 the user also knows that the field of view of the camera 62 (camera 3) is being displayed on monitor one 22. This is because the window 52 that indicates which camera is being displayed on monitor one 22 indicates that camera 3 (reference numeral 62) is being displayed thereon.

Similarly, if the user wishes to view an area herein called process 64, the user simply touches the graphic representation of the process 64. The closest camera 66 (camera 24) automatically begins monitoring the process 64. By looking at the windows 52, 54, 56 and 58 the user sees the "24" in window 54. The "24" in window 54 indicates that the field of view 68 of camera "24" (reference numeral 66) is being displayed on the second monitor 24. The camera field of view icon wedge 68 will change shape and/or direction if the user performs any manual PTZ functions at the console. In actual use, the user will be directed to the correct monitor because when the user touches an area on the display screen, the next new image to appear on a monitor will be the selected image. Thus, the changed monitor will serve to alert the operator.

Also shown in the map 50 are a safe 70 and a camera 72 (camera number 32). At present camera 72 is turned off. Therefore, no field of view is indicated. Should the user desire to view the safe all he or she need do is touch the graphic representation of the safe 70. The camera 72, which is the only camera capable of viewing the safe 70 because of the wall 74 is then activated and placed on an available monitor. A field of view wedge would then be seen (graphically represented) on the screen 30.

The graphics representation of field of view defined by the wedges 64 and 68 is created from feedback signals received from the RCC 80 and 82. The data includes whether the video unit is on or off, point of focus, degree of zoom, position of pan and tilt platform, etc. The feedback units 80 and 82 contain a multichannel A to D converter, serial communications port and single chip microprocessor with associated non-volatile memory. A power supply converts available power (low voltage AC) to that required by the RCC circuitry.

Function keys $f_1$-$f_8$ 70 are provided along the lower portion of the screen 30. The function keys 70 are "soft keys" and can be programmed to do a plurality of tasks when touched. They are analogous to the function keys of a keyboard. The function keys 90 may be programmed to accomplish such tasks as turning on a camera heater, activating PTZ capabilities, turning on a light, moving the screen to the next map in a certain direction, calling a "help" menu, etc.

Figure 3:
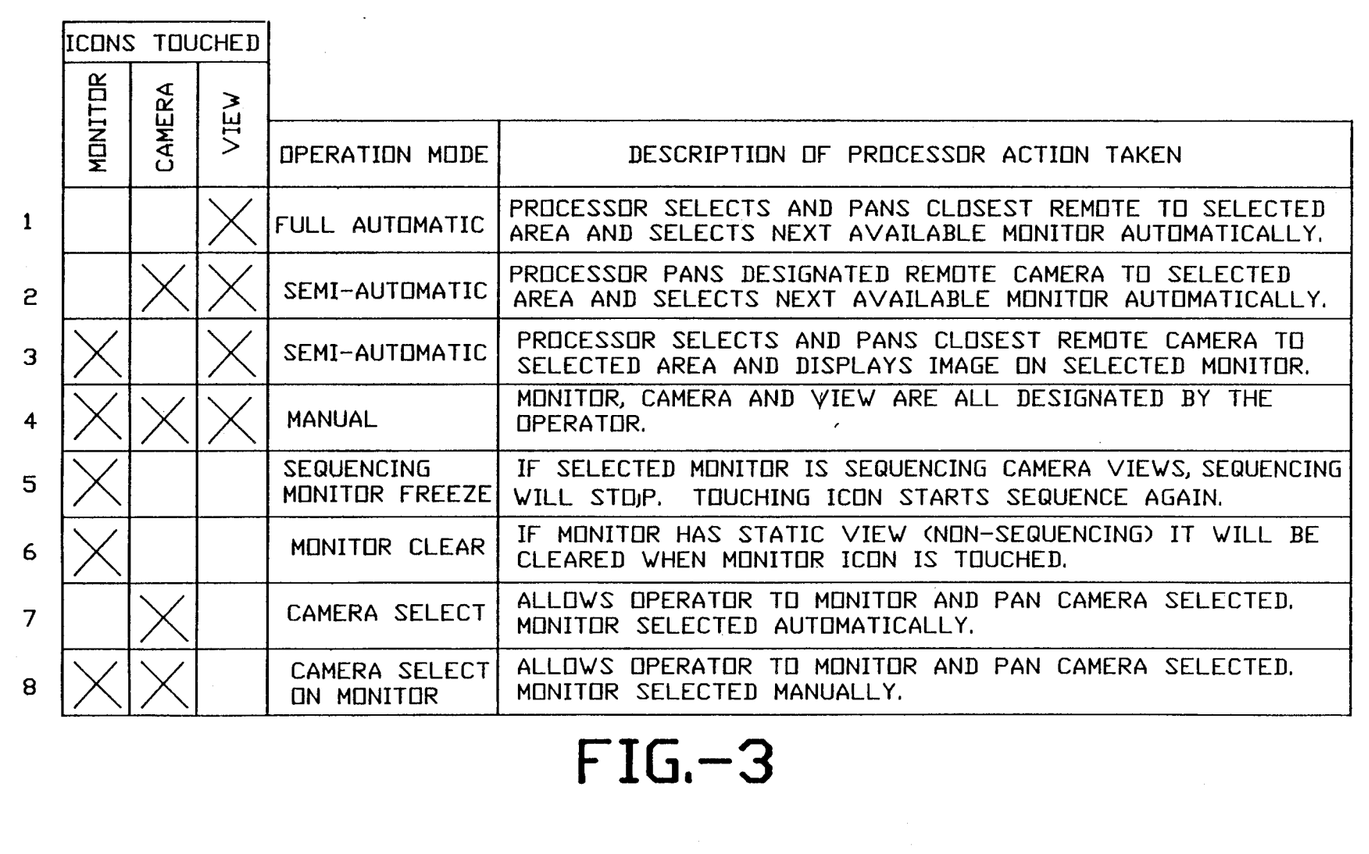
FIG. 3 is a state table illustrating the various modes of operation of the preferred embodiment.

Having discussed the physical aspect of the preferred embodiment, a discussion of the various functions provided by those physical aspects is now presented with reference to the above. Referring to FIG. 3, the closed circuit television network of the preferred embodiment can operate in a plurality of modes. Computer software resident in the processor 20 (as described below) is used to perform the functions provided by the various modes. Standard realtime programming techniques are used for both the processor and RCC software. A software flowchart indicative of the requisite programming steps is presented in FIG. 4. The flowchart 90 demonstrates how various user touch sequences control the display system. These sequences are classified as "modes" in FIG. 3 which is described immediately below.

Referring to FIG. 3, a pseudo state table 80 of the modes 1-8 of the preferred embodiment is presented. Mode 1 is the full automatic mode. The explanation of mode 1 (and all other modes) is best made with reference to both FIG. 2 and FIG. 3. Operation in the full automatic mode is similar to that described above with reference to FIG. 2. The only necessary input is that of the view desired to be displayed. On the portion of the screen 30 indicative of the view desired to be displayed is touched, the processor 20 selects and pans the closest remote camera to the selected area. The processor 20 then selects the next available monitor automatically and displays the desired view on that monitor.

The camera selection is determined by an algorithm that first identifies which camera or cameras can "see" the desired area. These camera views are immediately routed to available video monitors. Feedback from the RCC indicate the position of the camera and extent of focus. This information is used by the processor to determine the field of view of the camera with respect to the map display. The processor then creates an image of the active camera's field of view on the screen 30. At the same time, the proper focal length is determined by processor 20 and the focus information is sent to the camera lens. Zoom information is calculated to present a constant view height and width independent of the distance to the new target.

In regard to which monitor the image is displayed on, a priority scheme is utilized. When all monitors are active and a particular monitor is not designated, the monitor with the lowest priority camera image will be connected to the new and higher priority camera image. External alarms may also be prioritized for monitor display with overflow status indicated on the graphics control screen. Views holding in overflow are automatically routed to a monitor when it becomes available, i.e., is manually cleared.

Mode 2 is a semi-automatic mode. It is termed semi-automatic because it requires two inputs. One input to specify the view desired to be displayed and the other to select the camera to be used to view the desired area. Basically, mode 2 gives the user the option of selecting which camera is used to view a specific area, instead of having the processor make that selection automatically. In mode 2, the processor 20 pans the remote camera selected by the user to the selected area. The processor 20 also selects the next available monitor and automatically displays the view thereon. For example, in FIG. 2, the user may wish to view the back side of the asset 60. In that instance, the user would select a view of the asset by touching the asset 60 and then touch camera 66 (camera 24). Similarly, if the user wanted to view the back side on the process 64, the camera 62 (camera number 3) could be selected in this mode to view the process 64.

Mode 3 is also a semi-automatic mode. In mode 3, however, the two inputs from the user are the area desired to be displayed and the monitor on which to display the desired area. A monitor is selected by touching the desires monitor window, be it window 52, 54, 56 or 58. In mode 3, the processor 20 selects and pans the closest remote camera to the selected area. The processor 20 also displays the image on the selected monitor.

Mode 4 is a manual mode. It is a manual mode because the user selects the desired view, the camera to be used to capture the desired view and the monitor on which the view is to be displayed. Thus, the decisions which may alternatively be conducted by the processor 20 in the full automatic mode are made by the user. In mode 4, the user selects the monitor, the area to be viewed and the camera to be used, by indicating these items on the screen 30. The processor acts on these inputs to position the selected camera to view the selected area and automatically displays that view on the selected monitor.

Mode 5 is the sequencing monitor freeze mode. As mentioned above, to provide input from a relatively large number of remote cameras on to one (or some other small number of monitors) a procedure called sequencing is used. For instance, a plurality of remote camera video output signals may be displayed sequentially on one monitor, one at a time, for a period of five or ten seconds each. Occasionally, the user will see something in one of the sequences that the user wishes to examine further. In mode 5, the user is able to stop the sequencing at the scene the user wishes to further investigate. The sequence is stopped by the user simply by touching the window corresponding to the monitor the user wishes to observe. Touching the appropriate window again restarts the sequencing procedure.

Mode 6 permits the user to clear a monitor. A primary reason for clearing monitors is to enable the user to focus on the other monitors without being distracted by extraneous views. Mode 6 operates in the static view format (nonsequencing). In mode 6, a monitor in static view format will be cleared when the window corresponding to the particular monitor is touched.

Mode 7 is the camera select mode. The user specifies the camera to be used by touching the camera icon. Once specified the user can pan, tilt, focus and zoom the selected camera to the extent available. The PTZ functions are controlled with touch screen inputs or with the optional PTZ control device 42 referenced in FIG. 1.

Mode 8 is similar to mode 7, except that mode 8 allows the user to also select the monitor on which to display the camera view.

Figure 4:
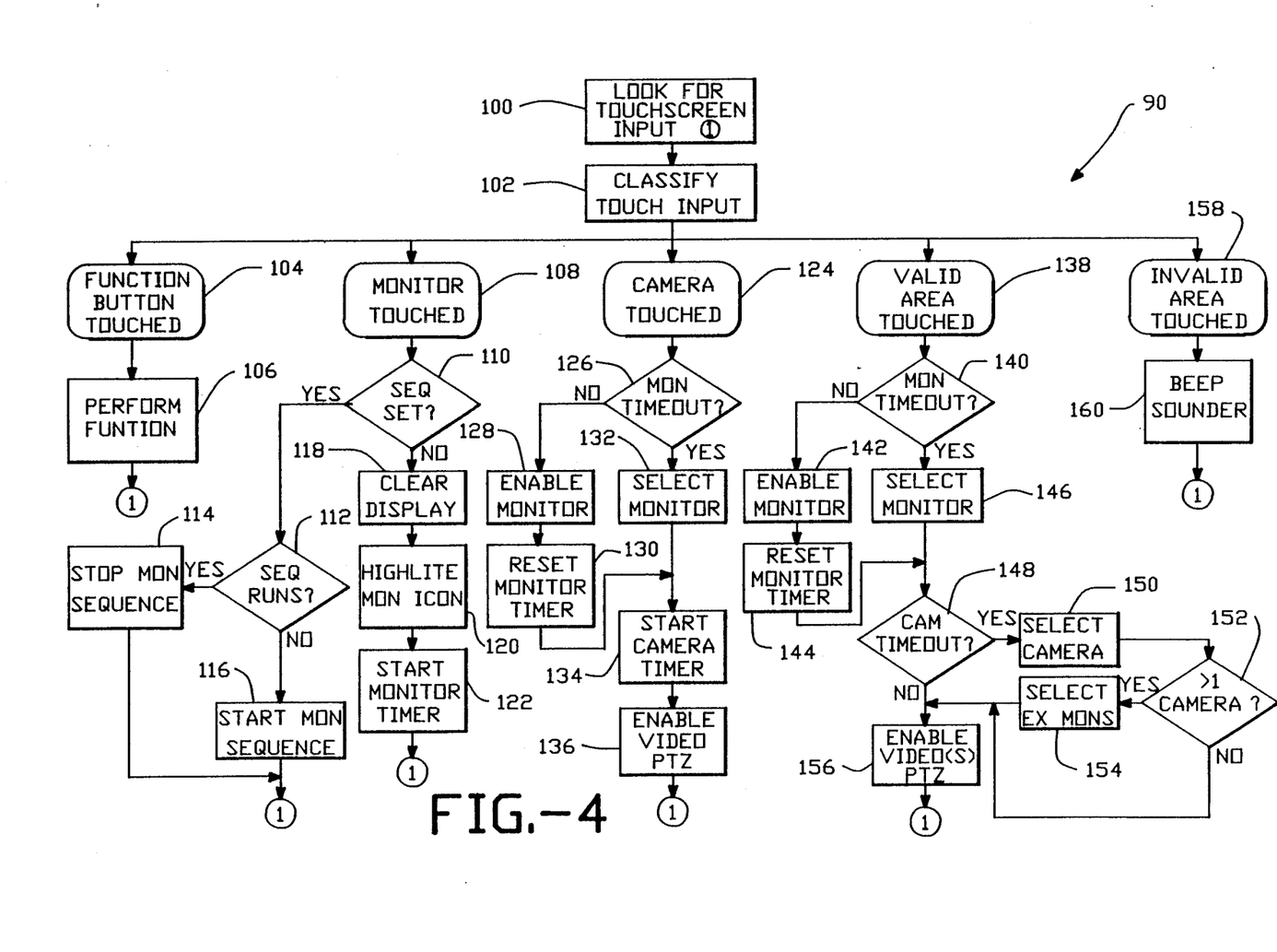
FIG. 4 is a block diagram of the computer software operating within the preferred embodiment.

Referring to FIG. 4, an overview of the software necessary to invoke the touch control operation of the preferred embodiment is presented. It is presented by way of a diagrammatical flowchart In step 100, the software waits for a touch on the screen. A touch, once received is echoed by a starburst or a "+" to indicate actual location of the touch. In step 102 the type of touch input is classified. The classification can be broken down into five types. The first, in step 104, is when a function key of button (70 of FIG. 2) is touched. In that case the function is performed (step 106) and the program returns to step 100, waiting for another screen input.

FIG. 4 is set up to work from left to right, beginning at step 108 and moving to step 124 and step 138. Steps 108, 124 and 138 correlate to the icon monitor touch columns for monitor, camera and view, respectively, in FIG. 3. If view is touched first the system 10 knows it is in mode 1. If a camera icons is touched first, the system 10 is either in modes 2 or 7. If a view area is touched after a camera icon is designated, then the system is in mode 2.

If a monitor is touched first, the system is either in mode 3, 4, 5, 6 or 8. If only a monitor icon is touched (step 108) the system is in mode 5 or 6, the determination of which one of these modes is made in step 110. If only a monitor (step 108) and a camera (step 124) are designated then the mode 8 is entered. If only a monitor (step 108) and a view (step 138) are entered then the program is in mode 3. If the monitor, camera and view icons are touched (steps 108, 124 and 138), in that order, then the program enters the manual mode, mode 4.

Continuing with a step-by-step description of FIG. 4, a second type of touch classification is the monitor icon (step 108). When it is designated, a first inquiry is whether a preset video sequence is currently being displayed on the monitor that is designated (step 110). If the answer to this inquiry is "yes" a second inquiry need take place. In step 112, a determination is made of whether the video sequence is currently sequencing. If sequencing, then the sequence is frozen on the display from the particular monitor (step 114). Alternatively, in step 112, if it is determined (within sequence mode) that a sequence is not currently running, the sequence is restarted, switching the monitor to the next video input signal in the sequence (step 116).

If in step 110, a determination is made that the sequencing mode is not enabled, the particular monitor is cleared (step 118). Next, the monitor icon for that monitor is highlighted to make the indication of its inactive state readily noticeable to the user (step 120). In step 122, the monitor timer is enabled. The program then returns to step 100. Each monitor has a timeout function. The timeout function clears the camera after a certain time period. For example, the timeout may be set for one minute so that after the image has been displayed and viewed the monitor is automatically cleared so that it is available for other uses. After the monitor timer is enabled the program returns to step 100.

If a camera icon is touched in step 102, the program flows to step 124, detecting that a camera icon has indeed been touched. A first inquiry, step 126, is whether a monitor timeout has occurred. If it has not, a monitor is enabled (step 128). The monitor timer is then reset (step 130). If a timeout has occurred in step 126, then the software automatically selects a monitor that displays the image from a selected 20 camera, (step 132). In step 134, a start camera timer is enabled. In step 136, the video for that camera is enabled. Also in step 136, PTZ control for the camera is enabled, if applicable.

If in step 102 a "valid" area (one that is physically located within a screen map) is touched, the program goes to step 138 to begin the subroutine for the valid area mode. In step 140, a determination is made as to whether a monitor timeout has occurred. If it has not, a monitor is enabled (step 142) and the monitor timer is reset (step 144). If a monitor has timed out, that monitor is selected to view the video signal of the touched area (step 146). Steps 140–146 are analogous to steps 126–132. In step 148, a determination is made as to whether a camera has been selected. If one has, the program proceeds directly to step 156; if not, it proceeds to step 150. In step 150, the camera selection process takes place. A determination is made of whether there is more than one camera (152) that can view the selected area. If there are not, then the video output signal from the one available camera is used and the program goes directly to step 156. If there is more than one camera, then the additional cameras are displayed on available monitors. In step 156, the applicable video cameras are enabled, as well as their output signals. PZT components are similarly enabled in this step if they are available. The program then returns to step 100.

Moving to step 158, if an invalid area is touched (outside the map, monitors or function buttons) a recognition is made of same. In step 160, a beeper is sounded indicating the touching of an "invalid" area. The program then returns to step 100.

It should further be apparent to those skilled in the art that various changes in form and details of the invention as shown and described nay be made. It is intended that such changes be included within the spirit and scope of the claims appended hereto.

I claim:

1. A video camera system, comprising: a plurality of video cameras, each of said plurality of video cameras monitoring portions of a physical area;
   at least one monitor for displaying images from said plurality of video cameras;
   video switching means coupled between said plurality of video cameras and said monitor for switching selected ones of said video cameras to said monitor;
   computer means coupled to said video switching means for controlling said video switching means for generating from said computer a graphical icon simulation of at least a portion of said physical area and displaying said simulation on a display screen; and means located in said computer means for producing signals to effect a display of at least one of said plurality of video cameras on said monitor in response to a designation of said graphical icon simulation.

2. The video camera system of claim 1 wherein said graphical icon simulation includes icons of at least a portion of said physical area and said field of view of at least one of those of said plurality of video cameras in said displayed portion of said physical area.

3. The video camera system of claim 1 wherein said computer means further comprises: means for indicating in said graphical icon simulation which ones of said video cameras are coupled to said monitors.

4. The video camera system of claim 1 wherein said computer means further comprises:
   camera control means connected to each of said video cameras for controlling the field of view of each of said video cameras;
   means coupled to said camera control means, for responding to the designation of location in said graphical icon simulation of said physical area by moving one of said plurality of video cameras into a position to monitor said physical area corresponding to said designated location in said graphical icon simulation of said physical area; and
   means for indicating in said graphical icon simulation of said physical area said field of view of said one of said video cameras moved into position to monitor said physical area.

5. The video camera system of claim 1 wherein said computer means further comprises:
   means for selecting, upon designation of a location in said graphical icon simulation of said physical area, one of said plurality of video cameras that is capable of viewing said designated location and said monitor to display an image of said location from said selected camera; and
   means for sending a signal to said video switching means for coupling said selected video camera to said monitor.

6. The video camera system of claim 1 wherein said displayed graphical icon simulation includes video camera icons indicative of location and of at least a subset of said plurality of video cameras, said computer means further comprises:
   means for responding to a designation of one of said video camera icons in said graphical icon simulation by activating said one of said plurality of video cameras that corresponds to said designated video camera icon simulation and displaying an image from said designated video camera of said monitor.

7. The video camera system of claim 1 wherein said computer means further comprises a touch display screen for operator designation of an icon in said graphical icon simulation.

8. The video camera system of claim 1 wherein said computer means further comprises a mouse electronically coupled to said display screen for operator designation of an icon in said graphical icon simulation.

9. An apparatus for controlling a closed circuit television network having a plurality of monitors and a plurality of remote video cameras, comprising:
   video switcher means coupled between said plurality of monitors and said plurality of remote video cameras for connecting specified ones of said plurality of remote video cameras to specified ones of said plurality of monitors;
   processor means for controlling connections between said plurality of remote cameras and said plurality of said monitors by video switcher means based on input information to said processor means; and
   graphical user interface means, coupled to said processor means for displaying a graphical icon representation, generated by said processor means, of a portion of a physical area including icons representing specific ones of said remote video cameras in said physical area and for inputting information to said processor means by generating control signal to said processor means in response to a designation of said graphical icon representation.

10. The apparatus of claim 9 further comprises:
    remote video camera control means coupled to each of said remote video cameras and said processor means for positioning a respective remote video camera upon receipt of signals from said processor means calling for movement of said respective remote video camera and for providing feedback signals from said remote video camera of a position and field of view of said remote video camera, said processor means using said feedback signals to create said graphical icon representation including a graphical icon representation of field of view of at least a specific one of said remote video cameras.

11. A method for a closed circuit television network having a plurality of video display monitors for displaying output signals from a plurality of remote video cameras, comprising the steps of:
   generating image signals and position information signals from at least one of said plurality of remote video cameras, said position information signals including field of view for said remote camera;
   generating on a graphics user interface screen a graphical icon representation of a physical area and said remote video cameras located in said physical area; and
   displaying on at least one of said video display monitors said image signals from at least one of said remote video cameras located in said physical area and displaying a corresponding field of view on said graphical icon representation of said remote video camera having image signals displayed on said monitor.

12. The method of claim 11 further comprising the steps of designating which of said plurality of remote video cameras is displayed on which of said monitors by responding to a designation of a graphical icon representation; and
   generating signals corresponding to said designation for coupling an appropriate remote video camera to an appropriate monitor.

13. The method of claim 11 further comprises the steps of:
   providing a graphical icon representation of a camera in said graphical icon representation of a physical area;
   designating said graphical icon representation of a camera, said camera icon representation corresponding to a physical camera in a physical area;
   enabling said physical camera which corresponds to the graphical icon representation of a camera; and
   displaying an output signal from said physical camera on one of said plurality of monitors by coupling said output signal from said physical camera to one of said monitors.

14. The method of claim 13 further comprises the steps of:
   providing a graphical icon representation of an actual monitor in said graphical icon representation of a physical area,
   designating a graphical icon representation of an area in said graphical icon representation of a physical area that correlates to a physical area,
   designating a graphical icon representation of a monitor in said graphical icon representation of a physical area that correlates to a physical monitor,
   displaying on said actual monitor in response to said area and monitor designation output signals from a remote camera in close proximity to said physical area, said displayed output signals being indicative of said physical area.

15. The method of claim 11 further comprises the step of:
   freezing a sequencing video display on a monitor by designating a graphical icon representation of a monitor.

16. The method of claim 15 further comprises the step of:
   clearing a video display from a monitor by designating said graphical icon representation of a monitor when said monitor is in a non-sequencing mode.

17. The method of claim 11 further comprises the step of:
   designating a graphical icon representation of a camera that correlates to a physical camera;
   providing independent monitoring and panning of said camera upon designating said graphical icon representation of a camera;
   selecting a monitor to display said output signal from said designated camera; and
   displaying output signals from said designated camera on said selected monitor.

18. The method of claim 17 further comprises the steps of:
   designating said graphical icon representation of a monitor within a specific time period of designating said graphical icon representation of a camera; and
   displaying the output signal from said designated camera on said designated monitor by coupling said output signal from said camera to said monitor.

* * * * *